UNITED STATES PATENT OFFICE.

SAMUEL LEWIS SUMMERS, OF PHILADELPHIA, PENNSYLVANIA.

BENZOIC-ACID ESTER OF METHYLENE DIGUAIACOL AND PROCESS OF MAKING SAME.

SPECIFICATION forming part of Letters Patent No. 721,924, dated March 3, 1903.

Application filed December 18, 1902. Serial No. 135,727. (No specimens.)

*To all whom it may concern:*

Be it known that I, SAMUEL LEWIS SUMMERS, a citizen of the United States, residing in the city of Philadelphia, State of Pennsylvania, have invented a certain new and useful Benzoic-Acid Ester of Methylene Diguaiacol and Process of Producing Same, of which the following is a full, clear, and exact description.

My invention relates to the production of a new chemical compound and is comprehensive as well of the new product as of a preferred method for its production. It has for its object to produce a new therapeutic agent having especial value in cases of pulmonary tuberculosis and chronic bronchitis and is to be administered internally. The new chemical individual which I have discovered therefor finds its chief utility as a new pharmaceutical product. It is a pea-green colored amorphous powder and is chemically the benzoic-acid ester of the diguaiacol derivative of methane.

The first step in the process to produce my new product is the formation of methylene diguaiacol, or, as it may be called, the "diguaiacol derivative" of $CH_4$, or methane. This is obtained by allowing formaldehyde to react on two molecules of guaiacol in the presence of a dehydrating agent, preferably phosphorus oxychlorid. The ultimate chemical reaction sought, however, is the formation of an ester by the reaction of an organic acid on the compound phenol. Being condensed with benzoic acid, the aforesaid combining reaction supervenes and an uncrystalline resultant is formed, which can be purified by boiling in a weak aqueous soda solution and afterward dried. The initial formation of the diguaiacol derivative of methane, however, is not essential, as it may be done simultaneously with, or rather as the first reaction preceding an immediately successive condensation with the benzoic acid, and I prefer to so carry through the process in practically one operation. To that end I take one hundred and twenty-two parts, by weight, of benzoic acid, two hundred and forty-eight parts, by weight, of guaiacol, adding one hundred and sixty parts of the phosphorus oxychlorid dissolved in a suitable solvent, such as xylene, and heat the solution to about 100° centigrade. Then an aqueous solution of thirty to forty parts of pure formaldehyde gas, of which I take about three hundred parts, by weight, and heating it pass the formaldehyde as a gas into the first-named solution. As soon as this is completed the combined product, which is the acid ester sought for, is allowed to cool, is then separated from the mother liquor, (which is the resultant side product from the original materials used,) and is washed in a weak solution of hot soda-water and is then collected and dried and is an amorphous powder of pea-green color, melting at about 54° centigrade, having the empirical formula $C_{24}H_{18}O_4$, is insoluble in hot water, but soluble in acetic acid, ether, and hot ethyl alcohol. In further description of the reaction cited it may aid to a better or more perfect understanding of it by a recital of reaction, showing the structural formula of the new product:

$$CH_2O + 2C_6H_4(OCH_3)(OH) + C_6H_5(COOH) =$$

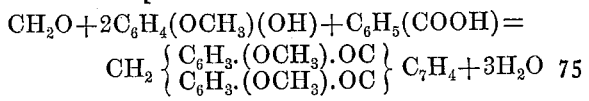

Having thus described my invention, what I claim as new, and desire to secure by Letters Patent, is—

1. The new product described, which is the benzoic-acid ester of methylene diguaiacol, a stable compound of benzoic acid chemically united with the diguaiacol derivative of methane; being an amorphous powder, pea-green in color, having the empirical formula $C_{24}H_{18}O_4$, melting at about 54° centigrade, insoluble in water, and soluble in acetic acid, ether and hot ethyl alcohol.

2. The process described, of producing the benzoic-acid ester of methylene diguaiacol, which consists in passing formaldehyde gas through an admixed heated solution of benzoic acid, guaiacol, and phosphorus oxychlorid preliminarily dissolved in a suitable solvent, and then isolating the resultant product from the mother liquor and washing it; substantially as described.

In testimony whereof I have hereunto affixed my signature this 17th day of December, A. D. 1902.

SAMUEL LEWIS SUMMERS.

Witnesses:
GEO. W. REED,
A. M. BIDDLE.